US007033179B2

(12) United States Patent
Harriman

(10) Patent No.: US 7,033,179 B2
(45) Date of Patent: Apr. 25, 2006

(54) WEB BASED FACTORY AUTOMATION TRAINING ON DEMAND

(75) Inventor: Merrill W. Harriman, Nashua, NH (US)

(73) Assignee: Schneider Automation Inc., North Andover, MA (US)

( * ) Notice: Subject to any disclaimer, the term of this patent is extended or adjusted under 35 U.S.C. 154(b) by 85 days.

(21) Appl. No.: 09/818,006

(22) Filed: Mar. 27, 2001

(65) Prior Publication Data

US 2002/0142269 A1    Oct. 3, 2002

(51) Int. Cl.
*G09B 19/00* (2006.01)
*G06F 17/00* (2006.01)

(52) U.S. Cl. .................. 434/118; 715/705; 345/336

(58) Field of Classification Search ............... 434/118, 434/219, 322, 323, 362, 363; 345/707–710, 345/711, 712, 705, 336; 705/1, 14; 715/705, 715/707–710, 712
See application file for complete search history.

(56) References Cited

U.S. PATENT DOCUMENTS

| | | | | |
|---|---|---|---|---|
| 3,357,113 | A | * | 12/1967 | Hagelbarger ............... 434/118 |
| 3,410,001 | A | * | 11/1968 | Blum ......................... 434/118 |
| 3,694,931 | A | * | 10/1972 | Bialek ........................ 434/118 |
| 4,541,056 | A | * | 9/1985 | Matthews ................... 434/118 |
| 4,622,013 | A | * | 11/1986 | Cerchio ...................... 434/118 |
| 4,941,829 | A | * | 7/1990 | Estes et al. ................. 434/118 |
| 5,239,617 | A | * | 8/1993 | Gardner et al. .............. 706/11 |
| 5,421,730 | A | * | 6/1995 | Lasker et al. ............... 434/118 |
| 5,442,759 | A | * | 8/1995 | Chiang et al. ................. 705/1 |
| 5,496,177 | A | | 3/1996 | Collia et al. |
| 5,535,422 | A | * | 7/1996 | Chiang et al. .............. 345/709 |
| 5,566,291 | A | * | 10/1996 | Boulton et al. ............. 345/709 |
| 5,597,312 | A | | 1/1997 | Bloom et al. |
| 5,602,982 | A | | 2/1997 | Judd et al. |
| 5,754,176 | A | * | 5/1998 | Crawford .................... 345/711 |
| 5,898,462 | A | * | 4/1999 | Harrison et al. ............ 348/552 |
| 6,259,445 | B1 | * | 7/2001 | Hennum et al. ............ 345/709 |
| 6,297,822 | B1 | * | 10/2001 | Feldman ..................... 345/705 |
| 6,311,323 | B1 | * | 10/2001 | Shulman et al. ............ 717/111 |
| 6,356,437 | B1 | * | 3/2002 | Mitchell et al. ............ 361/683 |
| 6,377,944 | B1 | * | 4/2002 | Busey et al. .................. 707/3 |
| 6,386,882 | B1 | * | 5/2002 | Linberg ...................... 434/262 |
| 6,388,665 | B1 | * | 5/2002 | Linnett et al. .............. 345/473 |
| 6,450,818 | B1 | * | 9/2002 | Ogawa et al. .............. 434/118 |
| 6,628,311 | B1 | * | 9/2003 | Fang .......................... 345/777 |
| 2001/0032244 | A1 | * | 10/2001 | Neustel ...................... 709/206 |
| 2001/0046660 | A1 | * | 11/2001 | Krueger ...................... 434/219 |
| 2002/0059378 | A1 | * | 5/2002 | Mustafa ...................... 709/205 |
| 2002/0154155 | A1 | * | 10/2002 | McKirchy ................... 345/705 |

OTHER PUBLICATIONS

Picon, Gerard, Schneider Automation, "Java and Programmable Automation Controllers," *CiMax: Edition Terrain*, No. 13—May/Jun. 1997 (in French w/ English translation included).

* cited by examiner

*Primary Examiner*—Kathleen Mosser

(57) ABSTRACT

System and method for training a user how to use software for programming a programmable logic controller (PLC). When the user encounters difficulties with programming the PLC, a training hyperlink option is provided to the user. Then, if the user selects the training hyperlink option, information is communicated automatically over a communications network, including information pertaining to the difficulties encountered by the user. The user is then linked to customized training resources which address the difficulties based upon the information that was automatically communicated when the user selected the training hyperlink option.

13 Claims, 3 Drawing Sheets

WEB BASED FACTORY AUTOMATION TRAINING ON DEMAND

TECHNICAL FIELD

The present invention relates to programmable logic controllers (PLCs), and more specifically to PLC training, and internet-based training.

BACKGROUND of the INVENTION

The programmable logic controller (PLC) was invented decades ago to replace sequential relay circuits for machine control. Although initially intended for the automobile industry, PLC's are now ubiquitous in industrial settings. Almost any industrial process that needs some type of electrical control has a need for a PLC in order to maximize efficiency, save money, and save time. In order to use a PLC, the PLC user accesses a control program, usually via software, in order to obtain desired goals.

Training on specific PLC equipment is often done only at the time when new PLC equipment is initially selected. Users will subsequently use the equipment for a number of years, but when a problem arises the user will often have forgotten the material learned years before. The user will have no convenient way of relearning or refreshing his or her memory with regard to particular material which was learned years earlier and which is now needed. An adequate and convenient system and method for PLC training on demand has thusfar not been invented, nor has internet and hyperlink technology been adequately exploited for this purpose.

Various techniques have been developed for obtaining customer service via the internet. For example, Dezonno et al. (U.S. Pat. No. 5,991,394) teach a system and method for customers to view products at a business web site, wherein the customer can activate an online "call me" button; the customer is then prompted for contact information, and the contact information is used to set up a telephone call to the customer. The process of entering contact information is time-consuming for the user, and there is the additional problem that the customer service representative will not know what to tell the customer until the customer explains why he activated the "call me" button.

Another example of a technique for obtaining customer service via the internet is Foladare et al. (U.S. Pat. No. 5,907,547), according to which a customer visiting a business web site can request a telephone call and data communications link with a customer service representative, and then the customer's terminal will be notified when a customer service representative is available so that the customer can choose whether to proceed with setting up the telephone call and data communications link. Again, this type of system would be unnecessarily time-consuming in the context of PLC training, because a customer according to Foladare must either wait while doing nothing, or proceed to deal with other distracting matters and issues, until a customer service representative is available to address the issues that prompted the customer to seek help.

Another patent related to the present invention is Hitchcock et al. (U.S. Pat. No. 5,823,781) which teaches how to train a user on a variety of computer software applications while the user is situated at the user's work station. According to Hitchcock, a user's proficiency level is diagnosed, and then the user is trained in a way that is tailored to the user's proficiency level, by providing the user access to a plurality of training software programs. Again, this is an inefficient approach in the context of PLC training, wherein a user would be wasting a great deal of time by being repeatedly subjected to diagnostic tests in order that the user be provided with the correct training. Moreover, the system of Hitchcock for teaching a user how to use computer software does not allow the user to obtain training by communicating directly with a central location maintained by the producers of the computer software, and therefore the producers of the computer software cannot easily monitor the use of their training materials or update them accordingly.

SUMMARY OF THE INVENTION

The present invention will train a user how to use software for programming a programmable logic controller (PLC). When the user encounters difficulties with programming the PLC, a training hyperlink option is provided to the user. Then, if the user selects the training hyperlink option, information is communicated automatically over a communications network, including information pertaining to the difficulties encountered by the user. The user is then linked to customized training resources which address the difficulties based upon the information that was automatically communicated when the user selected the training hyperlink option.

Automatic communication of the information alleviates the time-consuming problem of the user having to enter all of this information. It also eliminates the need for diagnostic testing of the user, because customized training will be provided based upon the information that was communicated automatically. Also, using web-based training solves the problem of waiting for an available customer service representative. Furthermore, communicating directly with a central location maintained by the producers of the computer software solves the problem of how the producers of the computer software can easily monitor the use of their training materials and update them accordingly.

The present invention provides integrated training on demand regarding factory automation subjects, unlike the prior art which at best suggests only time-consuming training systems which do not provide integrated training when it is demanded. In the software for programming a PLC, when an error occurs or when a user requests help, the training hyperlink option of the present invention is made available so that the user can seek assistance and training at any time. When this hyperlink option is selected by the user, a web browser can be launched with a link to the manufacturer's web site. Specific training will then be provided via a multimedia presentation on the specific error or help issue as determined automatically by the software context from which the user selected the hyperlink option.

The training received by the user will be voice, video, interactive screens, and/or presentation software (e.g. POWERPOINT presentation software available from Microsoft Corporation). Further live assistance from a customer service representative is also possible, in order to respond or answer questions beyond the automated training. Instead of a direct internet connection between the user and the manufacturer, the customer can also set up his own server to provide the manufacturer's training materials, and this solution may be preferred if, for example, access to the internet or to the manufacturer's web site is restricted.

BEST MODE FOR CARRYING OUT THE INVENTION

The present invention includes a method of training a person to use software for programming a programmable logic controller (PLC). This person may already know how to use the software to some extent, but nevertheless has gaps in that knowledge, perhaps due to forgetfulness or due to software revisions, or perhaps due to inattentiveness when first learning about the software a long time ago. The present invention is intended to quickly and efficiently fill the gaps in this person's knowledge, without teaching more than the person needs or wants to know. This invention adapts hyperlink and internet technology for this purpose.

Figure 1:
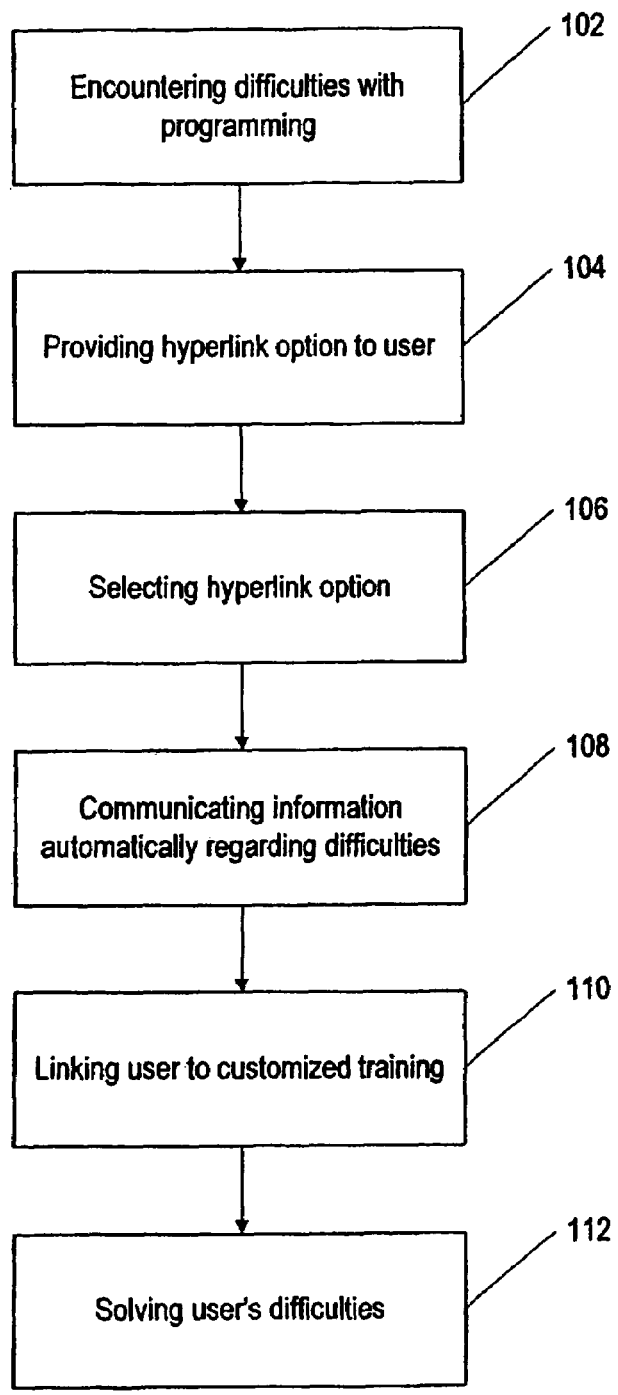
FIG. 1 is a flow chart depicting the method according to a best mode embodiment of the present invention.

FIG. 1 shows a high level flow chart of this method, according to a best mode embodiment of the present invention. When a user encounters 102 difficulties with programming the PLC, a training hyperlink option is provided 104 to the user. This can happen when the user becomes puzzled and requests the training hyperlink option (e.g. by pulling down a menu), or alternatively the training hyperlink option will be provided 104 automatically when the software detects that the user has made some sort of error.

The user may then select 106 the training hyperlink option, for example by clicking on it with a mouse. Selecting the training hyperlink option causes information to be automatically communicated 108 over a communications network, and this information pertains to the difficulties encountered by the user. The information will, for example, indicate what part or section of the software the user was using when the training hyperlink option was selected 106. The information may also indicate a particular error made by the user, the error having caused the hyperlink option to be provided 104 in the first place.

Based upon the information communicated 108 over the communications network, the user is then linked 110 to customized training resources which address the difficulties, so as to provide the user with solutions to the difficulties. In other words, the training resources are tailored to the specific needs of the user, for example based upon what part of the software the user is using, or based upon a particular user error detected by the software. The training resources preferably comprise material presented at an internet or intranet web site, and comprise a multimedia media presentation including at least sound and video. The training resources may also comprise a link to a customer service representative with whom the user may communicate, preferably in real time (e.g. by instant messaging). The training resources will solve 112 the user's difficulties, and allow the user to proceed with programming the PLC.

The communications network over which the information is communicated 108 may be a private, internal network, an intranet for example; also, the network may be secure with limited access. Typically the programmable logic controller is used for factory automation purposes, and thus the training resources to which the user is linked 110 will be related to those factory automation purposes.

The information about the user's difficulties, which is automatically communicated 108 over the communications network, may be used for other purposes in addition to linking 110 the user to customized training. For example, that information may be used to compile statistics in order to determine relative frequencies of various difficulties encountered with various parts of the software. These statistics can lead to software improvements as well as targeted modifications of the training resources. Modifying the training resources will typically be more easily accomplished than modifying the software, because typically the software must be installed on the user's workstation or terminal whereas the training resources can be modified by updating a web site.

Figure 2:
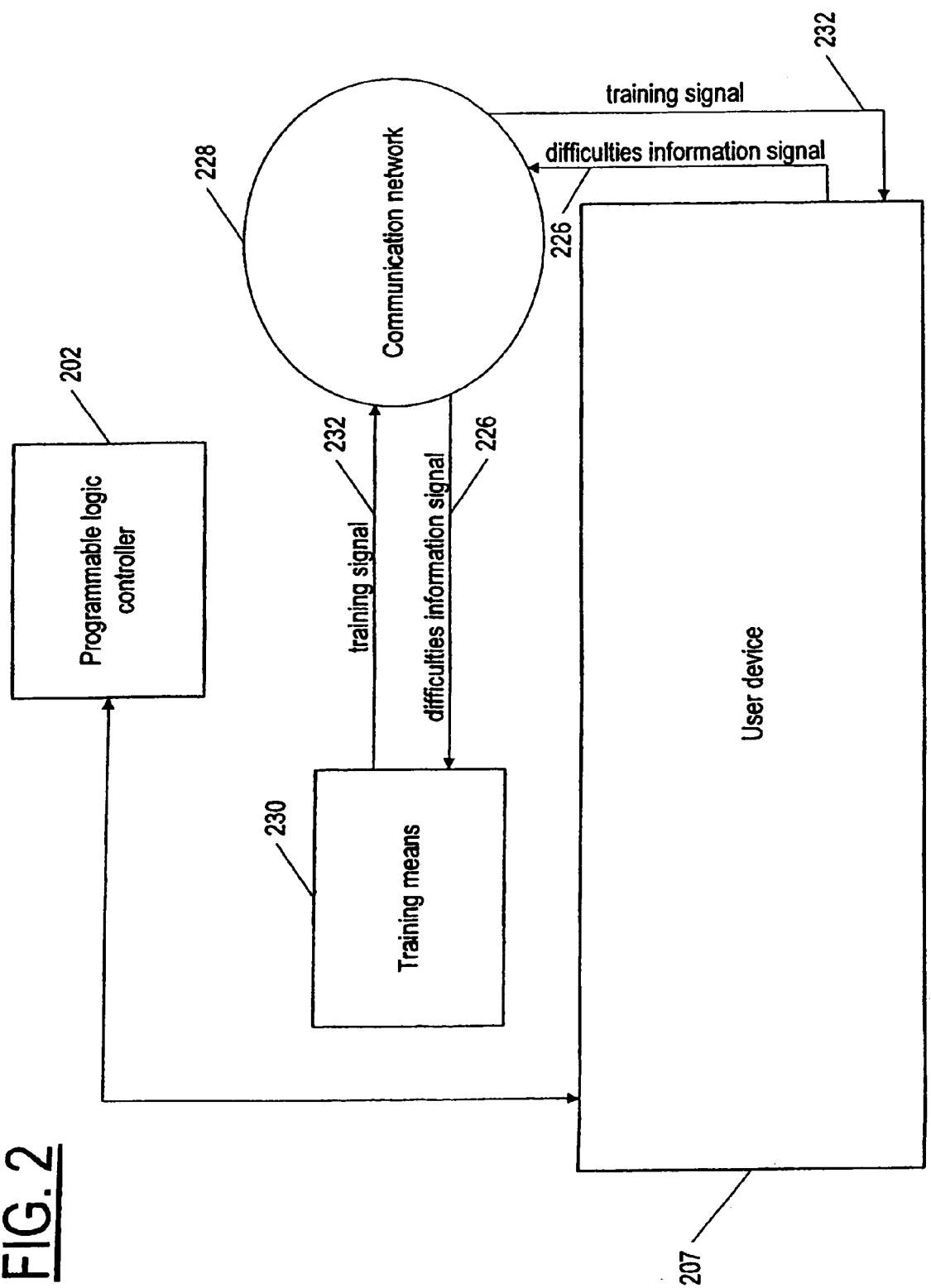
FIG. 2 depicts the system according to a best mode embodiment of the present invention.

FIG. 2 depicts the system according to a best mode embodiment of the present invention. A user device 207, which is operatively coupled to a programmable logic controller 202, enables the user to use the programming software and thereby program the programmable logic controller. The user device is capable of providing an optional hyperlink to the user, in response to difficulty encountered by the user, and the user device is also capable of providing a difficulties information signal on a line 226 which is indicative that the user has selected the hyperlink option in order to request training; the difficulties information signal on the line 226 is also indicative of the difficulty the user has encountered. A training means 230 is operatively coupled to the user device 207 via a communication network 228, and the training means 230 is for providing a training signal on a line 232 to the user device 207 in response to the difficulties information signal on the line 226. The training signal on the line 232 is indicative of customized solutions to the user's difficulty or difficulties, and may carry an audiovideo tutorial, interactive screens, presentation software, et cetera. The training means 230 will typically be located in a device controlled by the software manufacturer, but may alternatively be at a location on the premises of the user's employer in which case the data contained in the training means 230 would have to be periodically updated as the customized solutions are modified and improved.

Figure 3:
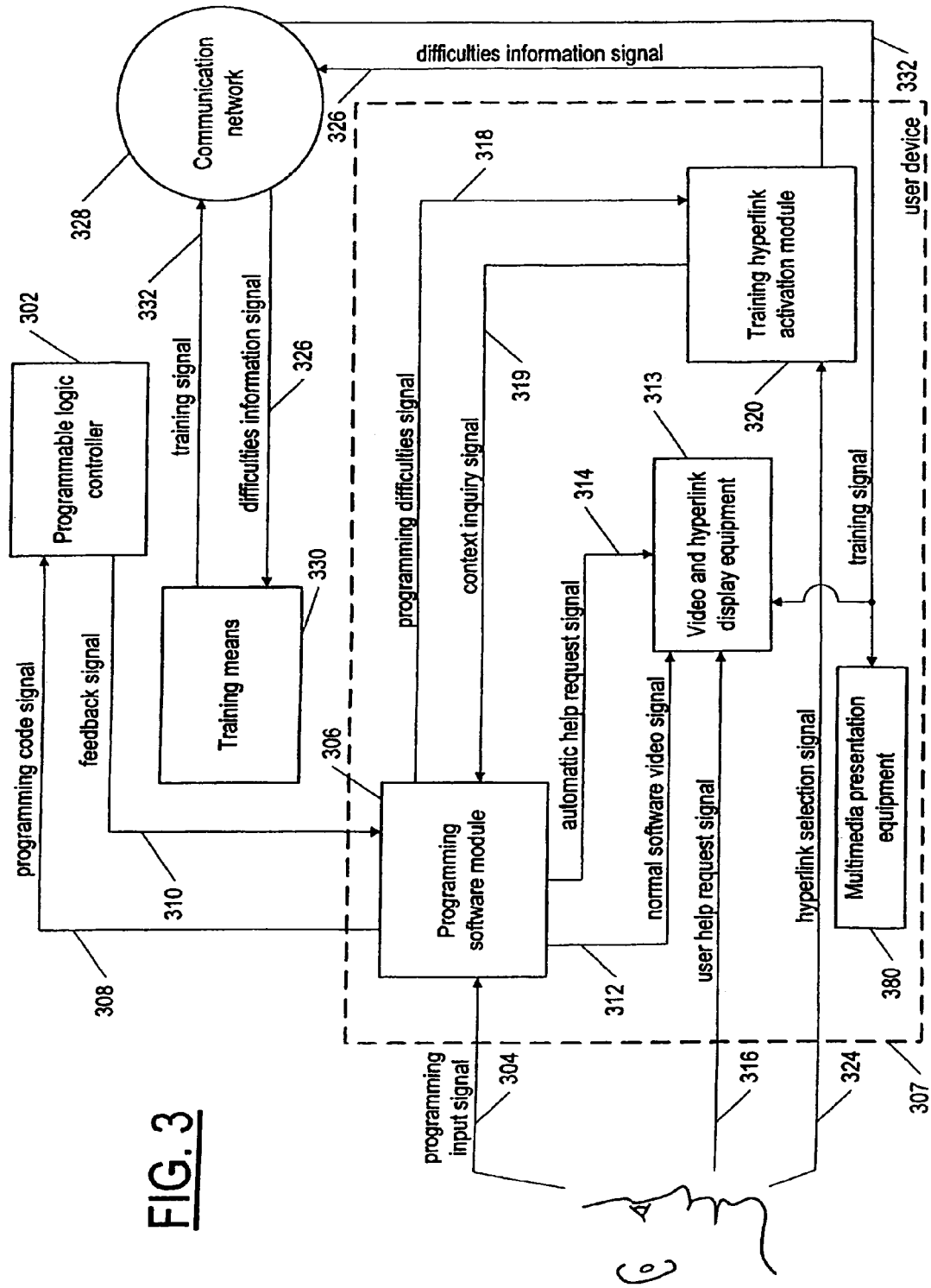
FIG. 3 shows a system as depicted in FIG. 2 but with more details.

FIG. 3 depicts a system as in FIG. 2 but with considerably more detail. Again, we have a user device 307 operatively coupled to a programmable logic controller 302. The user device 307 is capable of providing an optional hyperlink to the user in response to difficulty encountered by the user, and this occurs either in response to a request by the user or in response to the software detecting a user error. The user device 307 is also capable of providing a difficulties information signal on a line 326 which is indicative that the user has selected the hyperlink option in order to request training. The difficulties information signal on the line 326 is also indicative of the difficulty the user has encountered, and this may include information about the part of software being used by the user and/or the particular error made by the user. A training means 330 is operatively coupled to the user device 307 via a communication network 328 which may be a secure network with limited access. The training means 330 is for providing a training signal on a line 332 to the user device 307 in response to the difficulties information signal on the line 326. The training signal on the line 332 is indicative of customized solutions to the user's difficulty or difficulties, and may carry an audiovideo or multimedia tutorial, interactive screens, presentations produced by presentation software, et cetera. This training signal on the line 332 preferably conveys data from an internet web site or sites. The training signal may additionally provide data for linking to a customer service representative who can further assist the user, although a customer representative is unnecessary for the user to utilize training resources provided by the training signal on the line 332.

The training means 330 will typically be located in a device controlled by the software manufacturer or vendor.

Alternatively, instead of PLC vendor training, the training means 330 may be at a location on the premises of the user's employer in which case the data contained in the training means 330 would be periodically updated due to the customized solutions being modified and/or improved. Wherever it is located, the training means 330 is preferably modifiable in order to more effectively provide solutions to user difficulties. In other words, the data contained within the training means 330 is preferably modifiable at the same time as the software remains unmodified within the user device 307. Another possibility, instead of PLC vendor training or employer-controlled training, is that the PLC is installed or embedded in a machine tool, and the training means 330 is under the control of the machine tool builder. In each of these alternative best mode embodiments, PLC training is provided in response to user needs, for instance due to use errors or due to user requests for help.

As shown in FIG. 3, the user device 307 contains a variety of functional components and interactions. Among these components is a programming software module 306 which is responsive to a programming input signal on a line 304 from the user. This programming input signal on the line 304 conveys the user input necessary to program the programmable logic controller 302, and the programming software module 306 essentially translates this user input into code so as to provide a programming code signal on the line 308 to the PLC; the PLC responds to the programming software module 306 with a feedback signal on a line 310.

The programming software module 306 provides an automatic help request signal on a line 314 if user difficulties are detected, and also provides a programming difficulties signal on a line 318 to describe those difficulties, for example describing the part of software involved. Instead of an automatic help request signal on the line 314, the user may initiate a user help request signal on a line 316, and in either case a video and hyperlink display equipment 313 responds by providing the user with a training hyperlink option. The video and hyperlink display equipment 313 is also responsive to the training signal on the line 332 so that training resources can be presented to the user in a video format, and the video and hyperlink display equipment 313 is additionally responsive to a normal software video signal on a line 312 from the programming software module 306 so that normal programming information (unrelated to training) can be presented to the user in a video format.

Still referring to FIG. 3, the user device 307 further comprises a training hyperlink activation module 320, which is responsive to a hyperlink selection signal on a line 324 from the user, signifying that the user wishes to select the training hyperlink option. The training hyperlink activation module 320 is for providing the difficulties information signal on the line 326, and is responsive to the programming difficulties signal on the line 318. Furthermore, the training hyperlink activation module 320 is for providing a context inquiry signal on a line 319 which is necessary in order to prompt the programming software module 306 to provide the programming difficulties signal on the line 318, in those instances where the user requests help instead of the programming software module 306 detecting an error.

FIG. 3 also shows the user device 307 comprising multimedia presentation equipment 380 which is responsive to the training signal on the line 332. This multimedia presentation equipment 380 assures that the customized training can be provided to the user not just by video display, but also by audio for example.

It will be understood by those skilled in the art that all of the blocks and signals depicted in the Figures represent interactions and functional entities which preferably will be implemented by combinations of hardware and software. It will also be understood that these entities will not necessarily be entirely distinct from each other in practice, nor will the interactions preclude intermediate steps, nor do these entities and interactions preclude additional entities and interactions supplementing or enhancing the present invention.

It is also to be understood that the best mode embodiments described herein are only illustrative of the general concepts that we have invented. People skilled in the art will realize that numerous rearrangements and permutations can be made to these best mode embodiments, without departing from the spirit or scope of the present invention.

What is claimed is:

1. A method for training a user of software for programming a programmable logic controller, comprising the steps of:
   providing to the user a training hyperlink option in response to the user encountering difficulties with programming the programmable logic controller;
   communicating information automatically over a communications network, in response to selection of the training hyperlink option, wherein the information communicated automatically pertains to the difficulties encountered by the user; and
   linking the user to customized training resources addressing the difficulties based on the information communicated over the communications network, so as to provide the user solutions to the difficulties, assisting the user to proceed with programming the programmable logic controller,
   wherein the information further comprises data indicating at least one particular error made by the user, and
   wherein the information is used to compile statistics in order to determine which of the parts of the software cause more difficulties and which parts less difficulties.

2. A method for training a user of software for programming a programmable logic controller, comprising the steps of:
   providing to the user a training hyperlink option in response to the user encountering difficulties with programming the programmable logic controller;
   communicating information automatically over a communications network, in response to selection of the training hyperlink option, wherein the information communicated automatically pertains to the difficulties encountered by the user;
   linking the user to a website including training materials addressing the difficulties based on the information communicated over the communications network, wherein the website instructs the user as to how to overcome the difficulties, thereby assisting the user to proceed with programming the programmable logic controller,
   wherein programming the programmable logic controller to solve the programming difficulties is accomplished by programming input that comes from the user; and
   compiling statistics to determinine which aspects of programming the programmable logic controller cause more difficulties and which aspects cause less difficulties.

3. The method of claim 2, eherein the training hyperlink option is provided in response to a request by the user.

4. The method of claim 2, wherein the training hyper link option is provided automatically in response to an error when using the software.

5. The method of claim 2, wherein the information comprises data indicating at least one part of the software being used by the user.

6. The method of claim 2, wherein the information further comprises data indicating at least one particular error made by the user.

7. The method of claim 2, wherein the training material comprises a multimedia presentation.

8. The method of claim 2, wherein the training material comprises a link to a customer service representative so as to allow the user to communicate with the customer service representative.

9. The method of claim 2, wherein the communications network is a secure network with limited access.

10. The method of claim 2, wherein the communications network is a private, internal network.

11. The method of claim 2, wherein the programmable logic controller is used for factory automation purposes, and wherein the training material is related to the factory automation purposes.

12. The method of claim 1, wherein the training material is modifiable in order to more effectively provide solutions to the difficulties.

13. The method of claim 12 wherein the training material is modifiable at the same time as the software remains unmodified.

* * * * *